United States Patent

[11] 3,630,794

[72] Inventor Henry P. Kirchner
700 South Sparks Street Borough, State College, Pa. 16801
[21] Appl. No. 11,857
[22] Filed Feb. 16, 1970
[45] Patented Dec. 28, 1971
Continuation-in-part of application Ser. No. 664,732, Aug. 31, 1967, now abandoned. This application Feb. 16, 1970, Ser. No. 11,857

[54] METHOD OF CHEMICALLY MACHINING ALUMINA
4 Claims, 5 Drawing Figs.
[52] U.S. Cl. .................................................. 156/2, 23/88
[51] Int. Cl. ................................................ C23f 1/00, C23g 1/28
[50] Field of Search .......................................... 156/2; 23/88

[56] References Cited
OTHER REFERENCES

Alford et al– Chemical Polishing and Etching Techniques for $Al_2O_3$ Single Crystals, pp. 193–194, Apr. 1963, Journal of the American Ceramic Society-- Discussions and Notes.

Robinson et al.– The Deposition at Si upon Sapphire Substrates. p. 272, Vol. 236, Mar. 1966, Transactions of the Metallurgical Society of AIME.

Mergault et al.– Contribution a l' Etude de l' Ionisation du Fluorure de Chrome, de Palamine et de la Silice les Fluorure et Chlorure de Sodium Fondys. pp. 3060– 3062, Apr. 1963, Compt. Rend, Vol. 256– Academie des Sciences.

Primary Examiner—J. Steinberg
Attorney—Wenderoth, Lind & Ponack

ABSTRACT: A method of chemically machining alumina, comprising the steps of covering the portions of an alumina body to be machined, packing the alumina in a fluoride packing material, and refiring the alumina at a refiring temperature, whereby the uncovered portions of the alumina will be reduced in size.

METHOD OF CHEMICALLY MACHINING ALUMINA

This application is a continuation-in-part of U.S. Pat. application Ser. No. 664,732, filed Aug. 31, 1967, now abandoned.

This invention relates to a method of machining alumina, and more particularly to a method of machining alumina by chemical treatment thereof.

One of the disadvantages of working with alumina as a ceramic is that it is so hard that it is difficult to machine, and consequently it is difficult to obtain alumina parts which have accurate dimensions. It can be ground or cut with diamond finishing tools, but there are a number of disadvantages in grinding or cutting to close tolerances. Only one or a small number of pieces can be machined at one time; labor costs are thus high. Diamond tools are expensive. Many operations, such as rounding corners, are inconvenient. Chipping of the material often occurs, and localized damage to the material itself sometimes occurs.

It is an object of the present invention to provide a method of treating alumina to machine it in which tools are not used, thus avoiding the above-recited disadvantages.

A further object of the invention is to provide a method of treating alumina by chemically machining it.

The method by which these objects are achieved is to cover the portions of an alumina body which are to remain dimensionally unchanged, and to pack the alumina body in a fluoride and fire it at a refiring temperature. Depending on the amount of fluoride in the packing material, and the temperature and time of firing, more of less alumina will be removed from the uncovered portions of the alumina body.

The invention will now be described in greater detail in connection with the accompanying drawings, in which.

Figure 1:
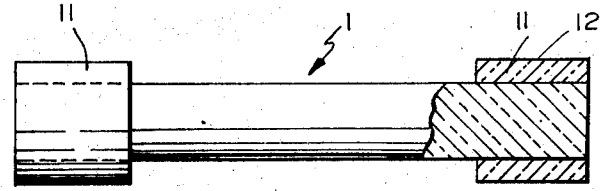
FIG. 1 is a side elevation view of a masked rod of alumina prior to packing and firing.
Figure 2:
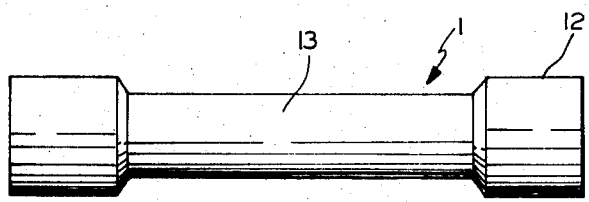
FIG. 2 is a side elevation view of the rod after firing.

The method of the present invention comprises preparing the body 10, shown as a rod in FIG. 1, to be chemically machined by first covering the portions 12 which are to remain unchanged by the chemical machining. This can be accomplished by covering those portions 12 with a covering 11 which is either of a material which is impervious to the action of the fluorides in the packing material during firing, or which is sufficiently thick that even if it is reduced in thickness by the fluorides in the packing material during firing, it will not be completely removed, thereby leaving the dimension of the body 10 unchanged. In practice, it has been found that covering the portions 11 with alumina of a thickness greater than the thickness of the alumina to be removed during firing is an easy way to protect the portions which are to remain unchanged during machining.

Then the covered body 10 is placed in a container, such as a sagger, in which it is to be fired, and fluoride containing packing material, which is crystalline at room temperature, is packed around it. It is then placed in the firing apparatus and fired at the refiring temperature for the amount of time necessary to produce the amount of etching necessary to remove the desired amount of material. It is then removed and cooled, and taken out of the packing material, and the covering material is removed.

The resulting body will have alumina removed from the uncovered portion 13 so that the portion 13 will have a smaller dimension than the covered portions 12. In the case of a rod or bar, the portion 13 will be reduced in diameter relative to the covered portions 12.

In a preferred embodiment, an alumina body is covered with a covering material, as described above, and it is packed in a firing material which is from 30-100 percent $CrF_3$, which is crystalline at room temperature. The thus-packed body is placed in a firing apparatus and is fired at a temperature of from about 1,250° C. to about 1,700° C. The duration of the firing time varies with two factors, the temperature and the amount of alumina to be removed. At the lower end of the temperature range, the firing time will be longer for removal of a given amount of material, while at the higher end of the temperature range, a shorter firing time can produce the same amount of removal of material. The cooling step is carried out by removing the packed body from the firing apparatus and letting it stand in the atmosphere at room temperature.

In order to provide a more detailed description of the exact manner of carrying out the method of the invention, several examples will now be given. In these examples, hydrated $CrF_3$ is used, but it will be understood that at the firing temperatures the water is driven off and plays no part in the etching action of the $CrF_3$.

EXAMPLE 1

A 96 percent alumina rod of ALSIMAG No. 614, a 96 percent alumina sold by American Lava Corp., ½ inch in diameter had hollow alumina cylinders fitted over the ends thereof, and was packed in 100 percent $CrF_3·3-½H_2O$. The packed rod was fired in a tube furnace at 1,400° C. for 1 hour.

When the rod was unpacked after cooling, the covered ends were unaffected, but the diameter of the center portion was reduced by 0.003-0.008 inch.

EXAMPLE 2

Two groups of rods like those of example 1 were prepared, but the ends were not covered. One rod in each group was packed in a first packing material that was a mixture of $CrF_3·3-H_2O$ and $Cr_2O_3$, while a second rod in each group was packed in a second packing material that had a different percentage of the fluoride, a third rod from each group being packed in a material with another different percentage of the fluoride, etc. The rods of the first group were fired at 1,650° C. for 4 hours, while the rods of the second group were fired at 1,650° C. for 1 hour.

Figure 3A:
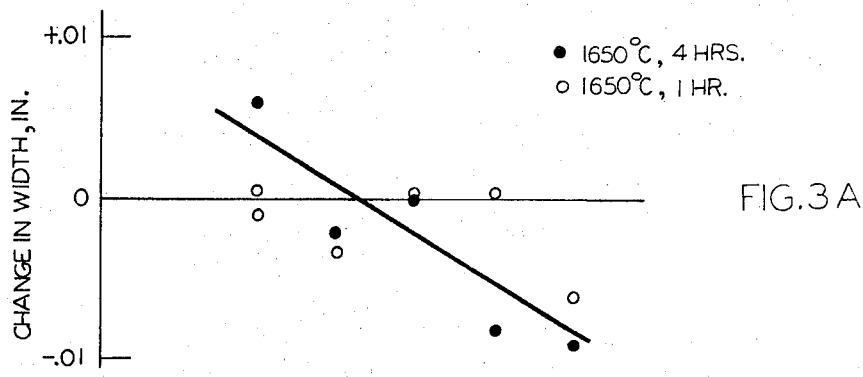
FIG. 3 is a graph showing the change in width of samples packed in various percentages of fluorides in the packing material.
FIG. 3b is a graph showing the change in length of samples packed in various percentages of fluoride in the packing material.
FIG. 3c is a graph showing the change of weight of samples packed in various percentages of fluoride in the packing material.
Figure 3B:
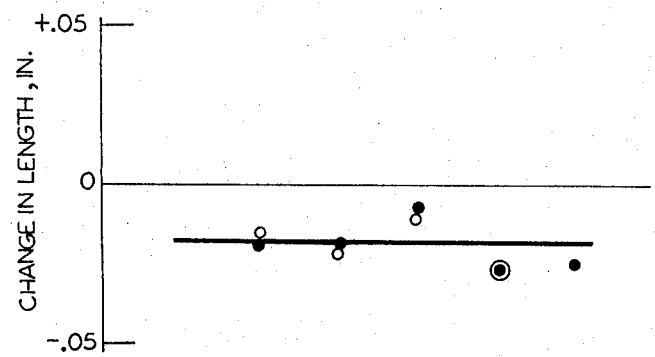
Figure 3C:
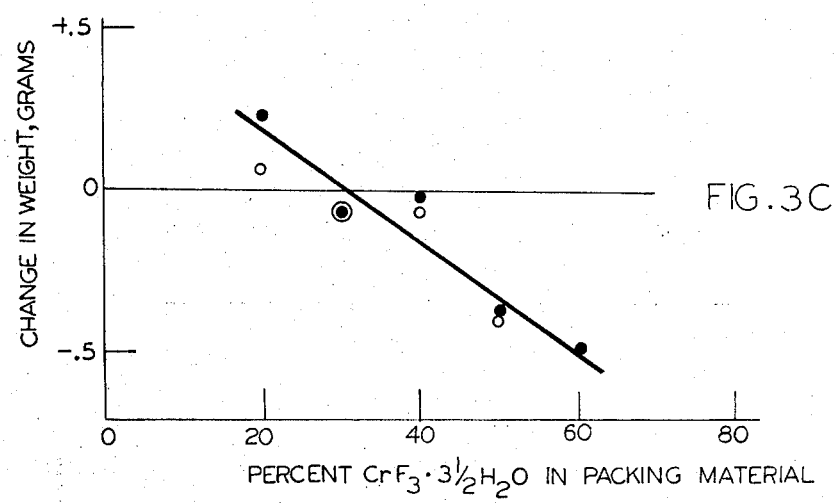

The change in width, the change in length and the change in weight was measured for all rods, and the graphs of FIGS. 3a-3c were prepared based on the resulting measurements. It can be seen that while the length remained substantially unchanged, indicating that the rods did not actually contract or shrink, the width was reduced when the percentage of fluorides in the packing material rose above about 30 percent, and the weight was reduced above a corresponding percentage of fluorides.

EXAMPLE 3

A rod like those of example 1 and having an initial outside diameter of 0.150 inch was packed in a combustion tube 2 feet long and having an inside diameter of 1-1.25 inch, and which was made of a ceramic material. The material in which it was packed was $CrF_3·3-½H_2O$. The end was plugged loosely, in order that when the tube was heated the confined gaseous products would not cause an explosion, and the packed tube was fired for 1 hour at 1,400° C. When the rod was removed from the combustion tube, it was found that the diameter had been reduced to 0.10 inch. By confining the alumina body to be machined, the concentration of the decomposition products was increased, thereby making them more effective in removing the alumina.

What is claimed is:

1. A method of chemically machining a body of crystalline alumina, comprising the steps of covering portions of the alumina body to be machined with a covering material for protecting the covered portions of the alumina body during machining, said covering material being a heat-resistant material with a thickness sufficient to protect said body during the chemical machining, packing the alumina body in a crystalline firing material which is from 30–100 percent $CrF_3$, refiring the thus-packed alumina body at a temperature of from about 1,250° to about 1,700° C. for a time sufficient to produce the amount of etching necessary to remove the desired amount of material from the uncovered portion of said body, whereby said uncovered portion of said body is reduced in size.

2. A method as claimed in claim 1 in which the step of covering comprises covering the portions of the alumina to be covered with alumina having a thickness greater than the thickness of alumina to be removed from the uncovered portions.

3. A method as claimed in claim 1 in which the packing material is $CrF_3 \cdot 3\frac{1}{2}H_2O$.

4. A method as claimed in claim 1 in which the packing material is a mixture of $Cr_2O_3$ and $CrF_3 \cdot 3-\frac{1}{2}H_2O$.

* * * * *